United States Patent
Tate et al.

(10) Patent No.: US 8,827,563 B2
(45) Date of Patent: Sep. 9, 2014

(54) SEALING BEARING WITH COMPACT STATIC OUTER DIAMETER SEAL

(71) Applicant: Schaeffler Technologies AG & Co. KG, Herzogenaurach (DE)

(72) Inventors: John Tate, Cornelius, NC (US); Stephen Carr, Waterford, MI (US); Craig Goddard, Cheraw, SC (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 0 days.

(21) Appl. No.: 13/846,108

(22) Filed: Mar. 18, 2013

(65) Prior Publication Data

US 2013/0251296 A1  Sep. 26, 2013

Related U.S. Application Data

(60) Provisional application No. 61/613,152, filed on Mar. 20, 2012.

(51) Int. Cl.
*F16C 33/76* (2006.01)
*F16J 15/32* (2006.01)
(Continued)

(52) U.S. Cl.
CPC ............ *F16C 33/768* (2013.01); *F16J 15/3276* (2013.01); *F16C 21/005* (2013.01); *F16C 33/605* (2013.01); *F16C 2361/41* (2013.01); *F16C 33/7876* (2013.01); *F16C 33/7809* (2013.01); *F16D 3/385* (2013.01); *F16C 33/783* (2013.01)
USPC ............................. 384/484; 384/477; 267/549

(58) Field of Classification Search
CPC .... F16C 33/768; F16C 33/782; F16C 33/784; F16C 33/7853; F16C 33/7876; F16D 3/385; F16D 3/41; F16J 15/3232; F16J 15/3276

USPC .......... 384/477, 484–486; 277/551, 562, 565, 277/572–575, 549; 464/131–133
See application file for complete search history.

(56) References Cited

U.S. PATENT DOCUMENTS 2,873,153 A * 2/1959 Haynie ..................... 384/484
3,200,615 A   8/1965 Stokely
(Continued)

FOREIGN PATENT DOCUMENTS

EP  458122 A2 * 11/1991 ............ F16C 19/18
EP  1260724 A1 * 11/2002 ............ F16C 33/80
(Continued)

OTHER PUBLICATIONS

International Search Report of parallel PCT application No. PCT/US2013/030863 issue date Jun. 27, 2013.
(Continued)

*Primary Examiner* — Marcus Charles
(74) *Attorney, Agent, or Firm* — Lucas & Mercanti, LLP

(57) ABSTRACT

A seal, which has a core with a radially outwardly extending flange with an end surface and a sealing body with a sealing lip and an over-molded portion that extends radially outward beyond the flange and encompasses the end surface of the flange. Also, a bearing arrangement is disclosed which includes a bearing cup that has a counterbore with a conical inner surface, and a seal, which is contactable with the bearing cup, and has a core with a radially outwardly extending flange with an end surface and a sealing body with a sealing lip and an over-molded portion which extends radially outwardly beyond the flange and encompasses the end surface of the flange. The seal can be press-fit with the bearing cup such that the over-molded portion and the conical inner surface of the bearing cup are in tight contact with each other and form a static seal.

16 Claims, 1 Drawing Sheet

(51) Int. Cl.
*F16C 33/60* (2006.01)
*F16D 3/38* (2006.01)
*F16C 21/00* (2006.01)
*F16C 33/78* (2006.01)

(56) References Cited

U.S. PATENT DOCUMENTS

| | | | | |
|---|---|---|---|---|
| 3,306,683 | A | * | 2/1967 | Deuring ............... 384/486 |
| 3,423,140 | A | * | 1/1969 | Cowles ............... 384/486 |
| 4,645,474 | A | * | 2/1987 | Olschewski et al. ........ 464/131 |
| 4,756,382 | A | * | 7/1988 | Hudson, III ............ 181/156 |
| 4,810,233 | A | * | 3/1989 | Crane et al. ............ 384/484 |
| 4,834,691 | A | * | 5/1989 | Schultze et al. ........ 384/486 |
| 4,943,262 | A | * | 7/1990 | Schultze ............... 464/131 |
| 4,949,981 | A | * | 8/1990 | Nagashima ............ 277/573 |
| 4,968,044 | A | * | 11/1990 | Petrak ............... 384/482 |
| 5,026,324 | A | * | 6/1991 | Schurger et al. ........ 464/131 |
| 5,597,356 | A | | 1/1997 | Rieder |
| 6,893,350 | B2 | | 5/2005 | Menosky et al. |
| 7,942,584 | B2 | | 5/2011 | Norimatsu et al. |
| 2005/0035555 | A1 | | 2/2005 | Peterson, Jr. et al. |
| 2006/0291761 | A1 | | 12/2006 | Dietl et al. |

FOREIGN PATENT DOCUMENTS

| | | | | | |
|---|---|---|---|---|---|
| JP | 2006105189 | A | * | 4/2006 | ............ F16C 33/78 |
| JP | 2006-322536 | A | | 11/2006 | |
| JP | 2007-100826 | A | | 4/2007 | |
| JP | 2010071323 | A | * | 4/2010 | ............ F16J 15/32 |
| JP | 2011-116171 | A | | 6/2011 | |
| JP | 2012127466 | A | * | 7/2012 | ............ F16C 19/06 |
| JP | 2012137122 | A | * | 7/2012 | ............ F16C 19/38 |

OTHER PUBLICATIONS

Written Opinion for parallel PCT application No. PCT/US2013/030863 issue date Jun. 27, 2013.

* cited by examiner

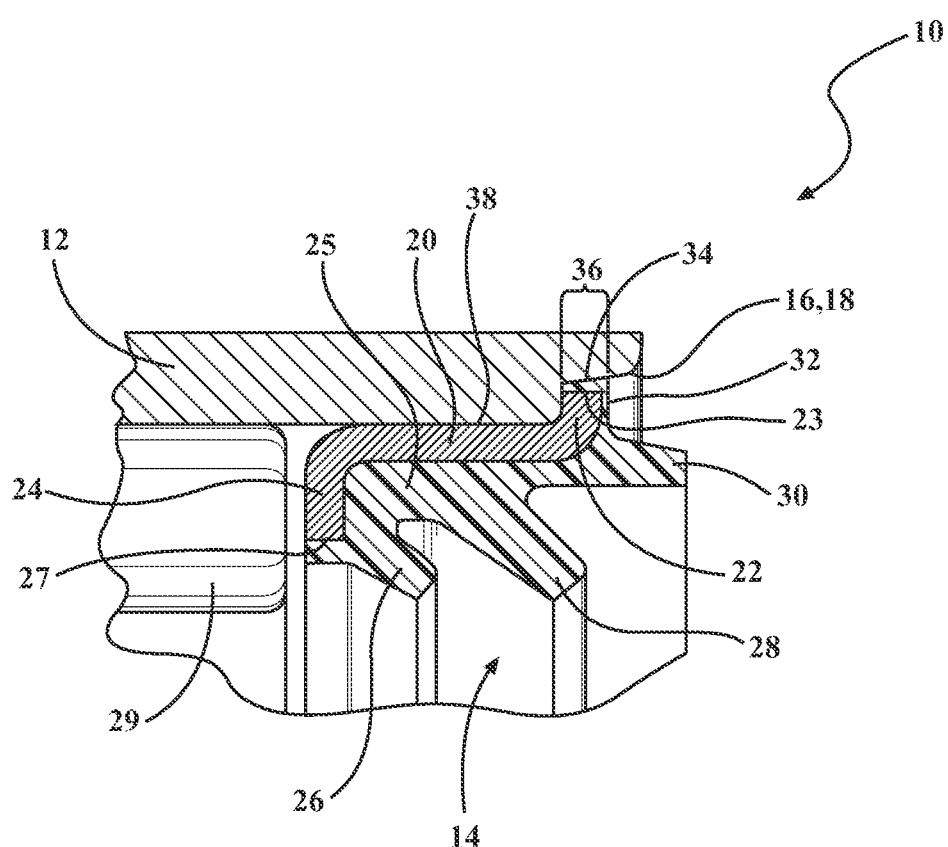

SEALING BEARING WITH COMPACT STATIC OUTER DIAMETER SEAL

CROSS-REFERENCE TO RELATED APPLICATIONS

This application claims the priority of U.S. 61/613,152 filed Mar. 20, 2012, which is incorporated in its entirety by reference herein.

FIELD OF THE INVENTION

The invention relates generally to a bearing and more specifically to a bearing which has a seal with an over-molded rubber portion that extends radially outward.

BACKGROUND OF THE INVENTION

Bearings containing seals, which are used, for example, in automotive and light truck U-joints/propshafts, steering shafts, or cardon joint applications, are known.

Known static seals intended for use in a small cross-section may contain, for example, an axial sealing, which is intended to prevent debris and/or liquid ingress. However, in known seals the ability of an axial lip to seal and prevent debris and/or liquid ingress depends on proper interference with a cup flange of a bearing. Improper interference can result in altered geometry or improper/no sealing or sealing around parts of a circumference.

One example of a seal is shown, for example, in U.S. Pat. No. 7,942,584. The seal taught by this patent is a press-fit seal that has an over-molded portion that extends over a circumferential surface.

Another example of a seal is shown, for example, in U.S. Pat. No. 5,597,356. The seal taught by this patent is a universal joint seal which does not have additional sealing for a press-fit interference.

A further example of a seal is shown, for example, in U.S. Pat. No. 3,200,615. The seal taught by this patent has an additional radial protrusion for sealing with a press-fit bore.

SUMMARY OF THE INVENTION

The present invention is directed to a bearing assembly that includes a bearing cup and a seal. The seal has an over-molded portion that extends radially outward to create a static connection with the bearing cup during a press-fit of the seal with the bearing cup. Both the bearing cup and seal have a substantially similar taper such that when the seal is pressed-in the bearing, the over-molded portion of the seal, which is tapered, compresses and creates an increased interference as the seal is seated. This is similar to a "corking" action. Thus, the present invention provides effective static sealing through the use of known manufacturing techniques without the use of adhesives or secondary operations.

The static seal created between the seal and bearing cup by the over-molded portion prevents debris/liquid ingress in the press-fit region and does not allow the debris/liquid to "wick" past the press-fit region of the seal. Moreover, the seal is not dependent upon flanging. The design allows for minimal package size variation and the ability to fit small cross-sections where packaging of existing technologies is not possible.

Broadly, the present invention is directed to a seal, which comprises a core that has a radially outwardly extending first flange with a first end surface and a sealing body that has at least one sealing lip and an over-molded portion which extends radially outwardly beyond first flange and encompasses the first end surface of the first flange. The over-molded portion can have a tapered or conical radially outer surface. Also, the core can be made of stamped sheet metal and can have a radially inwardly extending second flange with a second end surface. Moreover, the sealing body can have three sealing lips and be made of an elastomeric material such as rubber.

Additionally, the present invention is directed to a bearing arrangement, which comprises a bearing cup that has a counterbore with a conical inner surface and a seal, which is contactable with the bearing cup, and has a core a radially outwardly extending first flange with a first end surface, and a sealing body with at least one sealing lip, and an over-molded portion which extends radially outwardly beyond the first flange and encompasses the first end surface. The seal can be press-fit with the bearing cup such that the over-molded portion of the sealing body and the conical inner surface of the bearing cup are in tight contact with each other and form a static seal.

The conical inner surface of the bearing cup can be tapered radially and axially outward and the over-molded portion can have a radially outer conical surface, which is tapered with a slope that is substantially similar to a slope of the conical inner surface of the bearing cup, for sealing engagement with the conical inner surface of the bearing cup.

The bearing cup can be a drawn unflanged bearing cup.

BRIEF DESCRIPTION OF THE DRAWING

The present invention will be more fully described in the following detailed description of the invention taken in conjunction with the accompanying drawing, in which:

The FIGURE is a cross-sectional view of a drawn cup and seal of the present invention.

DETAILED DESCRIPTION OF THE INVENTION

At the outset, it should be appreciated that like drawing numbers appearing in different drawing views identify identical, or functionally similar, structural elements. Furthermore, it should be understood that the invention is not limited only to the particular embodiments, methodologies, materials, and modifications described herein and, as such, may vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art. Although any methods, devices, or materials similar or equivalent to those described herein can be used in the practice or testing of the invention, the following example methods, devices, and materials are now described.

The FIGURE illustrates a cross-sectional view of a bearing assembly 10. The bearing assembly 10 includes a bearing cup 12 and a seal 14, which can be press-fit with the bearing cup.

The bearing cup 12 has a counterbore 16 with an inner surface 18 which has a slope that is conical or tapered radially and axially outward and away from the seal 14. The bearing cup 12 is shown as being a drawn, unflanged bearing cup.

The seal 14 has a core 20 with a first flange 22 extending radially outwardly and a second flange 24 extending radially inwardly, and a sealing body 25 which has a first sealing lip 26, a second sealing lip 28 and a third sealing lip 30, and an over-molded portion 32. The first flange 22 has a first end surface 23 and the second flange 24 has a second end surface 27. The second flange 24 retains a roller bearing 29. The over-molded portion 32 extends radially outwardly and beyond the first flange 22 of the core 20 and encompasses the first end surface 23 of the core 20. The over-molded portion 32 has a tapered or conical radially outer surface 34 with a slope, which is substantially similar to the slope of the inner surface 18 of the bearing cup 12. In a press-fit with the bearing cup 12, the over-molded portion 32 engages with the inner surface 18 of the bearing cup 12 so as to provide a static seal area 36.

The contour of the inner surface 18 of the bearing cup 12 and the tapered or conical surface 34 of the over-molded portion 32 of the sealing body 25 create an increased interference and a static seal without the use of adhesives or secondary operations. The static seal area 36 created between the seal 14 and bearing cup 12 by the over-molded portion 32 prevents debris/liquid ingress in the press-fit region 38 and does not allow the debris/liquid to "wick" past the press-fit region 38 of the seal 14. The press-fit region 38 restricts axial motion between the bearing cup 12 and the core 20 so as to keep the seal 14 tightly engaged with the bearing cup 12. Moreover, the seal 14 is not dependent upon flanging, and the design allows for minimal package size variation and the ability to fit small cross-sections where packaging of existing technologies is not possible.

The core 20 is made from stamped sheet metal and the remainder of the seal is made from an elastomeric material, such as rubber.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope and spirit of the invention as claimed.

REFERENCE NUMERALS

10 Bearing Assembly
12 Bearing Cup
14 Seal
16 Counterbore
18 Inner Surface
20 Core
22 First Flange
23 First End Surface
24 Second Flange
25 Sealing Body
26 First Sealing Lip
27 Second End Surface
28 Second Sealing Lip
29 Roller Bearing
30 Third Sealing Lip
32 Over-molded Portion
34 Conical Surface
36 Static Seal Area
38 Press-fit Region

What is claimed:

1. A seal, comprising:
  a core having a radially outwardly extending first flange with a first end surface; and
  a sealing body having at least one sealing lip and an over-molded portion which extends radially outwardly beyond the first flange and encompasses the first end surface of the first flange, the over-molded portion having a tapered or conical radially outer surface, wherein the radially outer surface is conical or tapered in only one direction over an entire axial length of the radially outer surface.

2. The seal as claimed in claim 1, wherein the core has a radially inwardly extending second flange with a second end surface.

3. The seal as claimed in claim 1, wherein the sealing body has three sealing lips.

4. The bearing arrangement of claim 1, wherein the sealing body is made of an elastomeric material.

5. The bearing arrangement of claim 4, wherein the sealing body is made of rubber.

6. The bearing arrangement of claim 1, wherein the core is made of stamped sheet metal.

7. The seal of claim 1, wherein the entire axial length of the radially outer surface of the over-molded portion extends from an outer axial end facing away from the core to an inner axial end, the radially outer surface tapering radially outward from said inner axial end to said outer axial end.

8. A bearing arrangement, comprising:
  a bearing cup having a counterbore with a conical inner surface; and
  a seal, which is contactable with the bearing cup, having a core with a radially outwardly extending first flange that has a first end surface, and a sealing body with at least one sealing lip, and an over-molded portion which extends radially outwardly beyond the first flange and encompasses the first end surface,
  the over-molded having a conical radially outer surface in sealing engagement with the conical inner surface of the bearing cup and the conical surface of the over-molded portion being tapered with a slope that is substantially similar to a slope of the conical inner surface of the bearing cup.

9. The bearing arrangement of claim 8, wherein the seal is press-fit with the bearing cup such that the over-molded portion of the sealing body and the conical inner surface of the bearing cup are in tight contact with each other and form a static seal.

10. The seal as claimed in claim 8, wherein the core has a radially inwardly extending second flange with a second end surface.

11. The bearing arrangement of claim 8, wherein the conical inner surface of the bearing cup is tapered radially and axially outward.

12. The bearing arrangement of claim 8, wherein the bearing cup is a drawn unflanged bearing cup.

13. The bearing arrangement of claim 8, wherein the sealing body is made of an elastomeric material.

14. The bearing arrangement of claim 13, wherein the sealing body is made of rubber.

15. The bearing arrangement of claim 8, wherein the core is made of stamped sheet metal.

16. The bearing arrangement of claim 8, wherein the entire axial length of the radially outer surface of the over-molded portion extends from an outer axial end facing away from the core to an inner axial end, the radially outer surface tapering radially outward from said inner axial end to said outer axial end.

* * * * *